May 9, 1961  L. D. SHULL  2,983,542

MATERIALS-HANDLING DEVICE

Filed June 17, 1957  2 Sheets-Sheet 1

INVENTOR
LESTER D. SHULL
BY
Mason & Graham
ATTORNEYS

May 9, 1961 L. D. SHULL 2,983,542
MATERIALS-HANDLING DEVICE
Filed June 17, 1957 2 Sheets-Sheet 2

INVENTOR
LESTER D. SHULL
BY
*Mason & Graham*
ATTORNEYS

United States Patent Office 2,983,542
Patented May 9, 1961

2,983,542

MATERIALS-HANDLING DEVICE

Lester D. Shull, 8980 San Carlos Ave., South Gate, Calif.

Filed June 17, 1957, Ser. No. 666,103

4 Claims. (Cl. 294—78)

This invention has to do with devices for use in handling structural steel, railroad rails and other articles having laterally projecting flanges as well as other materials including bars, plates and the like.

It is common practice in the handling of structural steel to use wire rope slings about the girder or other member for the purpose of attaching it to the hook of the crane or other elevating device. The dangers inherent in this practice have long been recognized and many attempts have been made to devise a simple clamp for securely gripping the steel. While such devices of this nature with which I am familiar are generally safer to use than slings, they are nevertheless usually costly, often require precise handling in the attachment thereof to the member to be handled and are often of a nature such that they are limited in their use to a single type of beam or the like.

Therefore, it is an object of my invention to provide a novel materials- or work-handling or gripping means for use in handling structural steel and other materials which is of simple, rugged construction and can be manufactured relatively cheaply.

Another object is to provide a device of the type indicated which can be easily and quickly attached to or removed from the work and which, once attached, provides a safe means of handling the work.

A further object is to provide a device of the type indicated which can be used readily for safely picking up and righting a girder or the like which is lying on its side, and which can also be used in depositing a girder on its side from the normal lifting position.

More particularly, it is an object of the invention to provide a device designed particularly for use in gripping structural steel elements in which the device has a pair of opposed work-engaging members connected together by an endless rope or cable wherein one of the members is longer than the other and the cable is brought out through such member at a point such that it is substantially over the center of the portion of the work gripped by the device and in which the two main members of the device are designed for abutting engagement at their adjacent ends during handling of the work.

These and other objects will be apparent from the drawing and the following description. Referring to the drawing:

Fig. 5 is a side elevational view of an alternate form of the invention for use in connection with a rail or the like;

Fig. 7 is a side elevational view of a form of the invention similar to that shown in Fig. 6, but modified for adapting it to grasp logs and the like;

Figure 1:
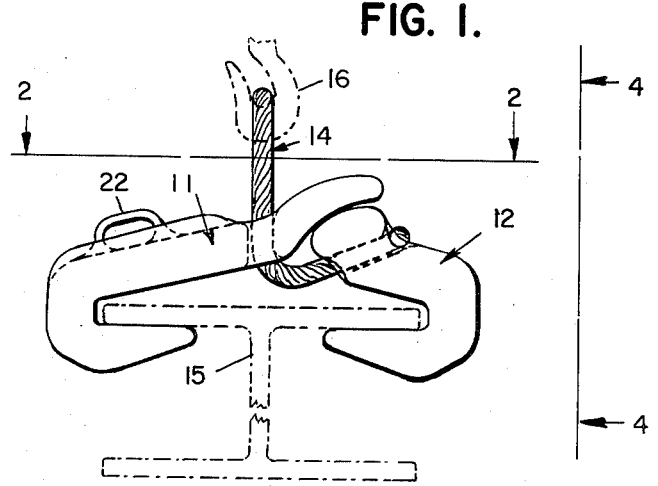
Fig. 1 is a side elevational view of means embodying the invention shown in gripping relation to the work.
Figure 2:
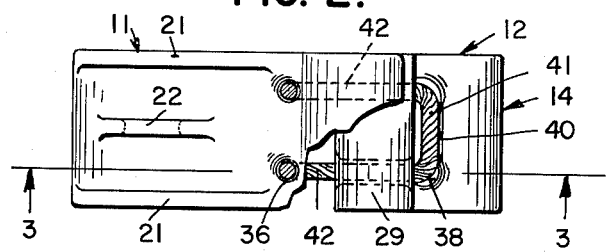
Fig. 2 is a sectional plan view on line 2—2 of Fig. 1 with a portion of the device broken away.
Figure 3:
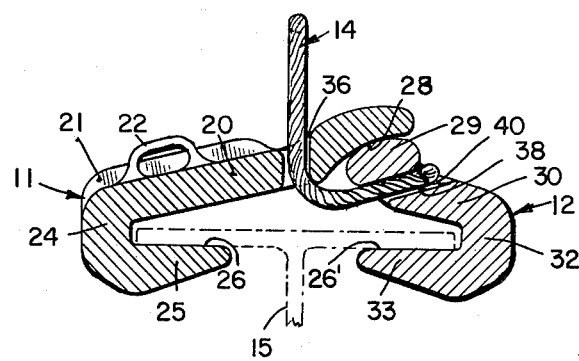
Fig. 3 is a sectional view on line 3—3 of Fig. 2.
Figure 4:
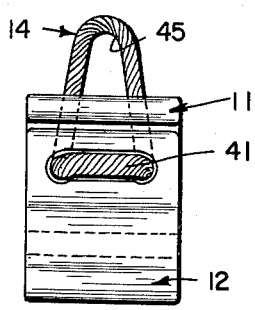
Fig. 4 is an elevational view in the direction of line 4—4 of Fig. 1.

More particularly describing the invention, I provide a three-piece device which includes a main or first work-engaging member 11, an auxiliary or second work-engaging member 12 and an endless cable or rope 14 which connects the members 11 and 12. In the form shown, members 11 and 12 are each generally hook-shaped. In Figs. 1 and 3 I have shown the device in gripping relation to work 15 shown as an H beam. The parts of my work-handling device are shown in the position which they occupy when the work 15 is being elevated or lowered by a suitable means such as a crane or the like, the hook of which has been designated 16.

The member 11 comprises an elongated body or main portion 20 which is of considerable lateral extent shown provided with a pair of optional reinforcing ribs 21 between which is an eye means 22. The member 11 is formed at one end to provide a hook-like shape by having a bight or return bend 24 and a terminal portion 25 therebeyond which extends generally back upon the main portion to define a recess 26 for receiving the work or any article to be gripped. The other end of the member 11 is formed to provide a recessed face 28 which acts as a socket or seat against which the end portion 29 of the member 12 abuts in the use of the device.

Member 12 includes a main portion 30 which is relatively short as compared to the main section 20 of member 11. It also includes a bight or return bend section 32 and an inwardly projecting terminal portion 33, the latter two portions being similar or corresponding to portions 24 and 25 of member 11.

The member 12 thus also provides a recess, indicated by 26', for receiving the work and in use the two recesses are disposed opposite or facing one another for gripping engagement with the flanges of a girder beam or the like.

The members 11 and 12 are connected by the endless cable or rope 14 which passes through a pair of holes 36 in member 11 located in laterally spaced relation adjacent the abutment face or seat 28. Member 12 also has a pair of holes, indicated by 38. These are spaced laterally of the main portion 30 thereof and located adjacent and extending angularly with respect to the end having the face 39. Holes 38 are inclined toward the terminal portion 33 of member 12 to form an acute angle therewith. The holes 38 in member 12 are provided with flared end portions as are the holes 36 in member 11 to protect the endless cable or rope 14 against possible damage. Also on the upper or outer side of member 12 the two holes 38 are connected by a shallow groove indicated by 40 in which the run 41 of the rope is partially received. It will be apparent from the drawings that two runs 42 of the cable extend from the run 41 through the respective holes 38 and 36 in members 12 and 11, respectively, and terminate beyond member 11 providing a half-loop portion or bight 45 for the reception of elevating means, such as the hook 16 of a crane or the like.

In use members 11 and 12 are hooked about the edges of the flange of the girder or other work with the rope 14 in a slack condition. As the rope is subsequently tightened by the pull of the elevating apparatus, the member 12 is brought into engagement with the socket or seat 28 and the parts are securely held together by the rope for the lifting and transporting operation. For the purpose of releasing the work-handling means from a distance, a line may be secured to the eye means 22 so that when the work is lowered into position, and slack provided in the rope 14, the main member 11 may be pulled out of engagement with the work.

One of the features of the invention is the provision of a relatively long member and a cooperating shorter member so that the holes 36 in the longer member through which the rope 14 passes may be disposed substantially centrally intermediate of the lateral edges of the work. It is also a feature of my construction that the beam may be safely tilted while suspended and lowered to position it on its side. Further, if a girder is lying on its side, member 11 may be placed under the lowermost flange and member 12 placed over the upper flange. When the rope is drawn taut by elevating apparatus the girder will automatically be brought into the normal upright position illustrated in the drawing.

Figure 5:
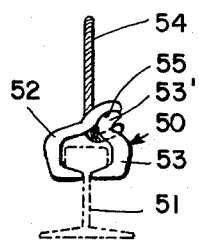

Although I have shown and described a preferred form of my invention, I contemplate that various changes and modifications can be made therein without departing from the invention, the scope of which is indicated by the claims. In this connection, for example, the members 11 and 12 have been shown as hook-like in shape for use in connection with structural steel. However, I contemplate that these may be shaped otherwise to provide for the gripping of other types of objects and in Figs. 5–11 I show several alternate forms of my invention. Fig. 5 illustrates a device 50 which is particularly suitable for elevating rails such as that shown at 51. This comprises a main work-engaging member 52 and auxiliary work-engaging member 53 associated therewith, the two being connected by an endless rope or cable 54. The members 52 and 53 are shaped as shown to render them particularly suitable for grasping the rail 51; otherwise they are substantially the same as the device previously described in that member 53 fits into a socket or recess 55 at the end of member 52 and in that the parts are held together by the rope or cable 54 which may be assumed to pass through two holes in each member as in the form of the device previously described. However, in this form of the device, and in those subsequently to be described, the auxiliary work-engaging member 53 at the end portion 53' extends for a limited distance in the same general direction as the other member.

Figure 6:
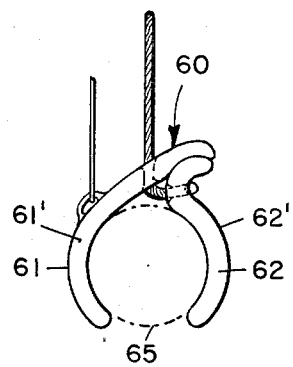
Fig. 6 is a side elevational view of another form of the invention for use in lifting circular objects.

In Fig. 6 I show a device 60 comprising a main work-engaging member 61 and an auxiliary work-engaging member 62, these being held together by a cable or rope 64. The relationship of the members 61 and 62 is the same as that in the device of Fig. 5 and the difference lies in the shape of the members 61 and 62 to provide curved, elongated sections 61' and 62' for grasping a circular object, such as that shown at 65.

Figure 7:
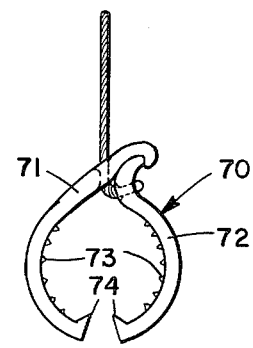

In Fig. 7 is shown a form of device 70 which is similar to that shown in Fig. 6 except that the work-engaging members, 71, 72, are provided with sharp projections or serrations 73 on their opposing faces and pointed ends 74 for the purpose of grasping a log or the like.

Figure 8:
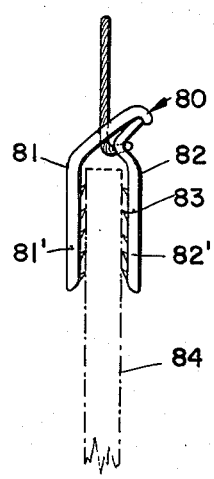
Fig. 8 is a side elevational view of a modified form of the invention for use in elevating flat-sided objects.

In Fig. 8 I show a form of the invention 80 wherein the work-engaging members, designated 81 and 82, are formed with straight, elongated sections 81', 82' provided with serrations or other roughening means 83 on their opposed surfaces for the purpose of grasping a flat-sided object, designated 84.

Figure 9:
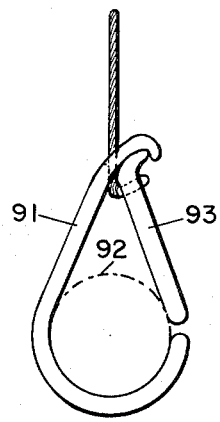
Fig. 9 is a side elevational view of a further modification.

In Fig. 9 I show a form of the invention which is somewhat different from the forms previously described in that here the main work-engaging member 91 carries substantially all of the load, shown as a circular member 92, and the auxiliary work-engaging member 93 merely serves as a keeper to retain the load and prevent its escape.

Figure 10:
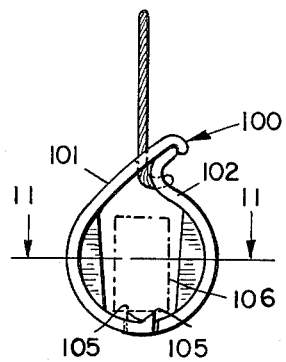
Fig. 10 is a side elevational view of still another form of the invention.
Figure 11:
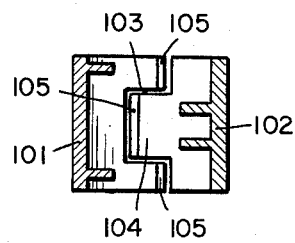
Fig. 11 is a sectional view on line 11—11 of Fig. 10.

In Figs. 10 and 11 I show an alternate form of the invention, designated 100, which is generally similar to that shown in Fig. 6 except that in this case the work-engaging members, designated 101 and 102, are formed to overlap or mesh at the lower end portions, member 101 being recessed at 103 to accommodate a projection 104 on member 102. If desired, the terminal edge portions of the two work-engaging members may be provided with upwardly projecting ridges 105 to facilitate the nonslip engagement of the device with an object 106.

It will be apparent from the above that the basic construction is present in all of the various modified forms of the invention and that the invention is therefore subject to many changes and variations without departing from the scope thereof.

I claim:

1. A work gripping and lifting device comprising a pair of unattached laterally separable bar members, each member having a work engaging portion at one end and an arcuate abutment face at its opposite end portion, the abutment faces of said members being in opposed working engagement, one of said abutment faces being convex and the other abutting face being concave and having a greater radius of curvature than the convex abutment surface to provide a shiftable fulcrum surface, an aperture in the end portion of each member between the abutment faces and the work engaging end portions thereof, and a flexible cable anchored on one member and extending through the aperture of both members to draw and maintain said abutment faces into abutting engagement to provide a self adjusting shiftable fulcrum therebetween when suspended by said cable.

2. The structure as set forth in claim 1 in which at least one working engaging end portion of said bar member is generally hook-shaped, and said flexible cable comprises an endless loop.

3. The structure as set forth in claim 1 in which the bar member having the concave face is substantially longer than said other bar member.

4. The structure as set forth in claim 1 in which the abutment face at the end portion of one bar member extends over a substantially greater area longitudinally thereof than is required to seat the opposing abutment face of said other bar member thereon.

References Cited in the file of this patent

UNITED STATES PATENTS

| | | |
|---|---|---|
| 580,900 | Rose | Apr. 20, 1897 |
| 696,873 | Langan | Apr. 1, 1902 |
| 1,858,432 | Chewing | May 17, 1932 |
| 2,133,660 | Eckl et al. | Oct. 18, 1938 |
| 2,279,570 | Kamppi | Apr. 14, 1942 |
| 2,452,452 | Girnus | Oct. 26, 1948 |
| 2,702,714 | Moses et al. | Feb. 22, 1955 |

FOREIGN PATENTS

| | | |
|---|---|---|
| 87,183 | Norway | Apr. 3, 1956 |